United States Patent
Kishigami et al.

(10) Patent No.: US 7,957,238 B2
(45) Date of Patent: Jun. 7, 2011

(54) OPTICAL RECORDING METHOD AND OPTICAL RECORDER

(75) Inventors: Tomo Kishigami, Tokyo (JP); Nobuo Takeshita, Tokyo (JP); Osamu Tsukahara, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 800 days.

(21) Appl. No.: 10/541,628

(22) PCT Filed: Jun. 4, 2004

(86) PCT No.: PCT/JP2004/007810
§ 371 (c)(1), (2), (4) Date: Jul. 7, 2005

(87) PCT Pub. No.: WO2005/086142
PCT Pub. Date: Sep. 15, 2005

(65) Prior Publication Data
US 2006/0133237 A1 Jun. 22, 2006

(30) Foreign Application Priority Data
Mar. 2, 2004 (JP) .................................. 2004-057993

(51) Int. Cl.
*G11B 20/10* (2006.01)
*G11B 5/09* (2006.01)
(52) U.S. Cl. ..................................... 369/47.5; 369/59.1
(58) Field of Classification Search ............... 369/59.11, 369/59.1, 59.12, 47.5–47.59, 47.42, 47.45
See application file for complete search history.

(56) References Cited

U.S. PATENT DOCUMENTS

| | | | |
|---|---|---|---|
| RE33,548 E | 3/1991 | Kime | |
| 6,414,922 B1 | 7/2002 | Akiyama et al. | |
| 6,418,102 B1 * | 7/2002 | Suga | 369/47.53 |
| 6,628,595 B1 * | 9/2003 | Sasa et al. | 369/59.12 |
| 6,771,579 B2 * | 8/2004 | Suzuki | 369/59.12 |
| 7,154,833 B2 * | 12/2006 | Ogawa | 369/53.34 |
| 7,158,460 B2 * | 1/2007 | Ogawa | 369/53.34 |
| 7,295,500 B2 * | 11/2007 | Nakano et al. | 369/47.53 |
| 2001/0014067 A1 * | 8/2001 | Iwata et al. | 369/53.2 |

(Continued)

FOREIGN PATENT DOCUMENTS

EP    1 361 571 A1    11/2003

(Continued)

*Primary Examiner* — Wayne R Young
*Assistant Examiner* — Aneeta Yodichkas
(74) *Attorney, Agent, or Firm* — Birch, Stewart, Kolasch & Birch, LLP.

(57) ABSTRACT

A write strategy for use in recording is determined from recommended write strategy parameters recorded on an optical disk (160) and the characteristics of the optical recording device used in recording; a recommended asymmetry value is determined from the difference between the numerical aperture NA1 of the objective lens, which is a recording condition of the recommended asymmetry value recorded on the optical disk (160) and the numerical aperture NA2 of the objective lens (150) of the optical recording device used in recording, and recording is carried out on the optical disk (160) according to the write strategy and asymmetry value thus determined. Optimal recording can be carried out even on an optical disk for which the optimal write strategy information has not been determined in advance, without the need to store write strategy information suitable for each and every optical disk.

33 Claims, 7 Drawing Sheets

U.S. PATENT DOCUMENTS

| | | |
|---|---|---|
| 2002/0021638 A1 | 2/2002 | Ohgake |
| 2002/0196719 A1* | 12/2002 | Morishima ................ 369/47.53 |
| 2003/0021201 A1 | 1/2003 | Kobayashi |
| 2003/0035355 A1* | 2/2003 | Morishima ................ 369/47.53 |
| 2003/0048709 A1* | 3/2003 | Van Woudenberg ....... 369/47.28 |
| 2003/0151994 A1* | 8/2003 | Tasaka et al. ............. 369/47.53 |
| 2005/0088940 A1* | 4/2005 | Toda et al. ................ 369/53.27 |
| 2008/0062842 A1* | 3/2008 | Kishigami et al. ......... 369/59.11 |

FOREIGN PATENT DOCUMENTS

| | | | |
|---|---|---|---|
| JP | 11-296885 A | 10/1999 | |
| JP | 2002-56531 A | 2/2002 | |
| JP | 2002-216350 A | 8/2002 | |
| JP | 2004-303317 A | 10/2004 | |
| WO | WO2004/027764 * | 4/2004 | ................ 369/53.34 |

* cited by examiner

(a) $\beta < 0$  (b) $\beta = 0$  (c) $\beta > 0$

FIG.11 though many storage devices such as memory devices are needed.
OPTICAL RECORDING METHOD AND OPTICAL RECORDER

FIELD OF THE INVENTION

The present invention relates to an optical recording method and an optical recording device for recording information on an optical recording medium, more particularly to a method of determining the write strategy to use in recording.

BACKGROUND ART

One example of a conventional optical recording device is a device having a recording and reproducing unit with a strategy section that controls the write strategy for writing to an optical disk, and a strategy information recording unit in which strategy information for operating the strategy section is recorded; strategy information corresponding to device information about the recording and reproducing device and medium information about the optical disk is recorded in the strategy information recording section, read from the strategy information recording section, and transferred together with the medium information to the recording and reproducing device. Default strategy information is also recorded in the strategy recording section in this device; if strategy information corresponding to the device information and medium information transferred from the recording and reproducing device is not recorded on the storage information recording section, the default strategy information is read and transferred to the recording and reproducing device (see, for example, Patent Document 1).

Patent Document 1: Japanese Patent Application Publication No. 2002-56531 (pp. 1-9, FIGS. 1-15)

DISCLOSURE OF THE INVENTION

Problem to be Solved by the Invention

In the above conventional optical recording device, as it is necessary to first investigate and then store in the optical recording device in the recording and reproducing device a large amount of strategy information corresponding to device information and medium information, much labor was required, and many storage devices such as memory devices were needed. Another problem has been that, since the default strategy information is used when strategy information corresponding to the device information and medium information is not stored in the recording and reproducing device, there are recording media that cannot be recorded on correctly because of mismatching recording conditions, depending on the optical conditions of the optical disk and the optical pickup.

The present invention addresses the above problems, a first object being to obtain an optical recording method and optical recording device that do not require the storage of all strategy information suitable for every optical disk and thus do not require storage devices of large capacity.

A second object is to obtain an optical recording method and optical recording device with which appropriate recording can be carried out even on an optical disk for which the optimal strategy information has not been determined in advance.

Means of Solution of the Problems

The present invention provides an optical recording method comprising the steps of:

reading recommended write strategy parameters from an optical recording medium on which the recommended write strategy parameters have been recorded;

determining a write strategy to be used in recording, based on the recommended write strategy parameters that were read and characteristics of the optical system of the optical pickup of the optical recording device used in recording; and writing to the optical recording medium by use of the optical recording device, using the write strategy thus determined.

Effect of the Invention

According to the present invention, given the recommended write strategy parameters recorded on the optical recording medium, an appropriate write strategy responsive to the characteristics of the optical system of the optical pickup of the optical recording device used in recording can be determined, and recording can be carried out using the optimal write strategy.

A further effect is that it is not necessary to determine the appropriate write strategy for all optical recording media experimentally beforehand, so labor and cost can be saved, and a large-capacity memory is not required.

EXPLANATION OF REFERENCE CHARACTERS

100 optical recording and reproducing apparatus, 110 semiconductor laser, 120 laser driver, 130 collimator lens, 140 beam splitter, 150 objective lens, 160 optical disk, 170 detecting lens, 180 photodetector, 190 head amplifier, 200 data decoder, 210 pre-pit detector, 220 asymmetry detector, 230 data encoder, 240 laser waveform controller, 250 central controller

BEST MODE OF PRACTICING THE INVENTION

The recording method and recording device in the present invention record information on an optical disk on which recommended write strategy parameters have been prerecorded. The recommended write strategy parameters represent a write strategy suitable for use in recording on the optical disk, and are recorded in the form of pre-pits, for example, in a predetermined area on the optical disk: the lead-in area, for example.

The optical disk includes, for example, a groove part (not shown) comprising grooves in which information is recorded, and a land part (not shown) between the grooves; the recommended write strategy parameters set by the recording media manufacturer are recorded in the land part together with other information such as an asymmetry value and the laser wavelength.

The recommended write strategy parameters envision that that recording will be performed under predefined conditions. For different recording conditions, therefore, it is preferable to use a write strategy different from the recommended write strategy parameters. According to the present invention, a write strategy is determined based on the recommended write strategy parameters read from the optical disk, and on the characteristics of the optical system of the optical pickup of the optical recording device used in recording, and recording is performed by use of the write strategy thus determined.

First Embodiment

Next, an embodiment of the invention will be described with reference to the attached drawings.

The optical recording method in the embodiment described below performs recording (write-once recording) on recording media of the dye type. The optical recording method in the embodiment below also performs mark-edge recording (PWM recording). To record information, based on the data to be recorded on the optical disk, it causes a semiconductor laser to emit multiple pulses to form recording marks. In other words, the write strategy used in the following embodiment is a strategy of the multi-pulse type, having a leading pulse in the mark period, and one or more multi-pulses following the leading pulse, except in the shortest mark. In the embodiment described below, in a write pulse strategy of this multi-pulse type, the pulse width of the leading pulse is changed responsive to the characteristics of the optical system of the optical pickup of the optical recording device.

In addition, in the embodiment described below, the recording of information onto the optical disk is carried out by illuminating the optical disk with optical pulses in patterns corresponding to 3T to 11T and 14T marks (T being the channel clock period) in EFM modulation.

The longest mark (the mark with length 14T) is a sync pattern.

Figure 1:
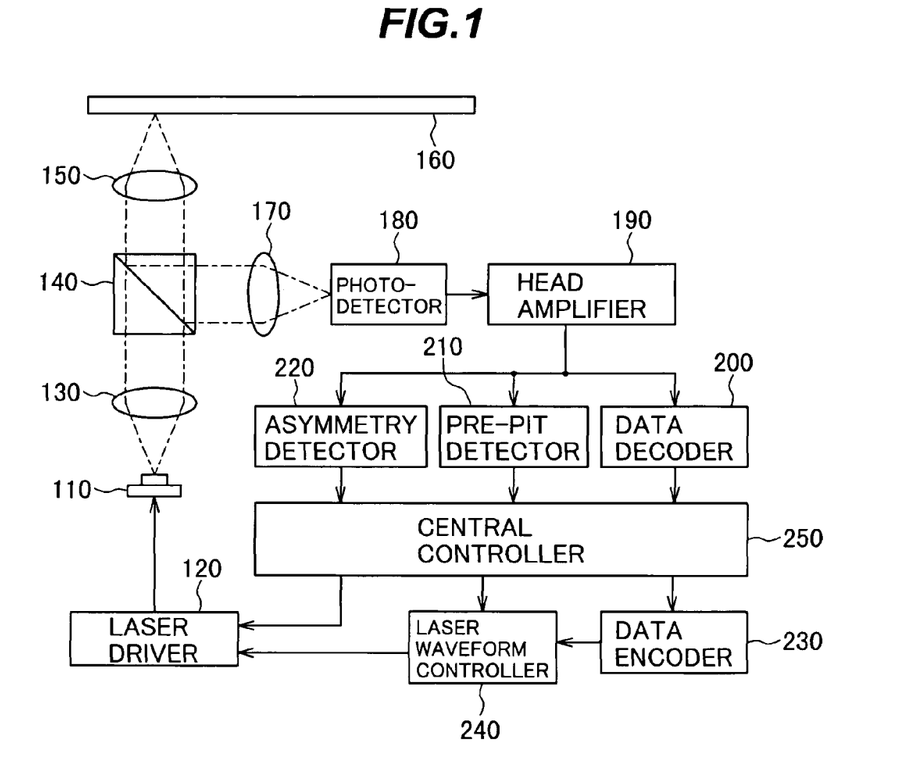
FIG. 1 is a block diagram showing an optical recording and reproducing device in a first embodiment of this invention.

FIG. 1 shows an example of the basic structure of an optical recording and reproducing apparatus 100 according to the first embodiment of the invention. In FIG. 1, the semiconductor laser 110 used as a laser light source is driven and controlled by a laser driver 120.

When data are reproduced, a laser beam emitted from the semiconductor laser 110 with the output value (reproducing power) necessary for data reproduction is focused onto the optical disk 160 through a collimator lens 130, beam splitter 140, and objective lens 150. The light reflected from the optical disk 160 passes through the objective lens 150, is separated from the incident light by the beam splitter 140, and is then received through a detecting lens 170 by a photodetector 180.

In the above structure, the semiconductor laser 110, collimator lens 130, beam splitter 140, objective lens 150, and detecting lens 170 constitute the optical system, which in turn, together with the photodetector 180, constitutes the optical pickup.

The photodetector 180 converts the optical signal to an electric signal. The electric signal converted by the photodetector 180 is input through a head amplifier 190 into a data decoder 200, a pre-pit detector 210, and an asymmetry detector 220. The data decoder 200 generates (reproduces) the data recorded on the optical disk 160 by performing such processes as demodulation and error correction on the input electric signal.

From the input electric signal, the pre-pit detector 210 detects pre-pit information including such information as the recommended write strategy parameters, which are the recommended parameters of the write strategy to be used for recording on the optical disk 160.

The asymmetry detector 220 couples the input electrical signal by AC (alternating-current) coupling and detects the peak level A1 and bottom level A2 of the AC-coupled electrical signal. Using the formula (1) below, it calculates an asymmetry value $\beta$ from the detected peak level A1 and bottom level A2.

$$\beta = (A1 + A2)/(A1 - A2) \tag{1}$$

The peak level A1 and bottom level A2 occur in places where spaces of maximum length alternate with marks of maximum length; these values are expressed with a zero level equal to the average value of the peak level and bottom level in places where spaces of minimum length and marks of minimum length appear alternately.

Figure 2:
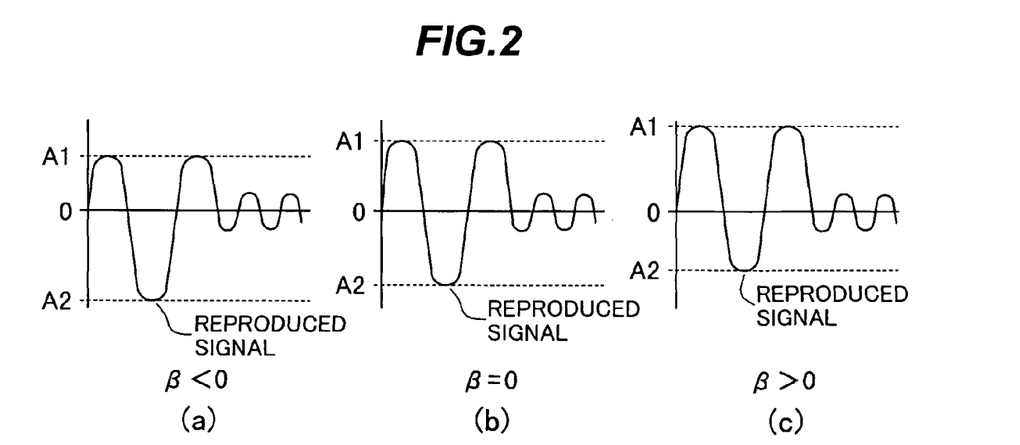
FIG. 2 shows examples of asymmetry values of the reproduced signal detected in the asymmetry detector in the first embodiment of this invention.

FIG. 2 shows examples of the detection of the asymmetry value in the detected reproduced signal in the asymmetry detector 220. FIG. 2(*a*) illustrates the case in which $\beta<0$. FIG. 2(*b*) illustrates the case in which $\beta=0$. FIG. 2(*c*) illustrates the case in which $\beta>0$.

In the recording of data, a data encoder 230 adds error correction symbols to the original data to be recorded and modulates the data to generate the recording data on which the driving signal to the semiconductor laser 110 is based. A laser waveform controller 240 generates a write strategy signal based on the recording data. When provided with recording data specifying one of 3T to 11T or 14T by a central controller 250, that is, the laser waveform controller 240 outputs a write strategy signal corresponding to the provided recording data (a signal having a waveform approximately matching the waveform of the emitted optical pulse train).

The laser driver 120 drives the semiconductor laser 110 with the driving current responsive to the write strategy signal thus generated. A laser beam emitted from semiconductor laser 110 with the output value (recording power) necessary for recording the data is focused onto the optical disk 160 through the collimator lens 130, beam splitter 140, and objective lens 150. Thus, the information is recorded.

Figure 3:
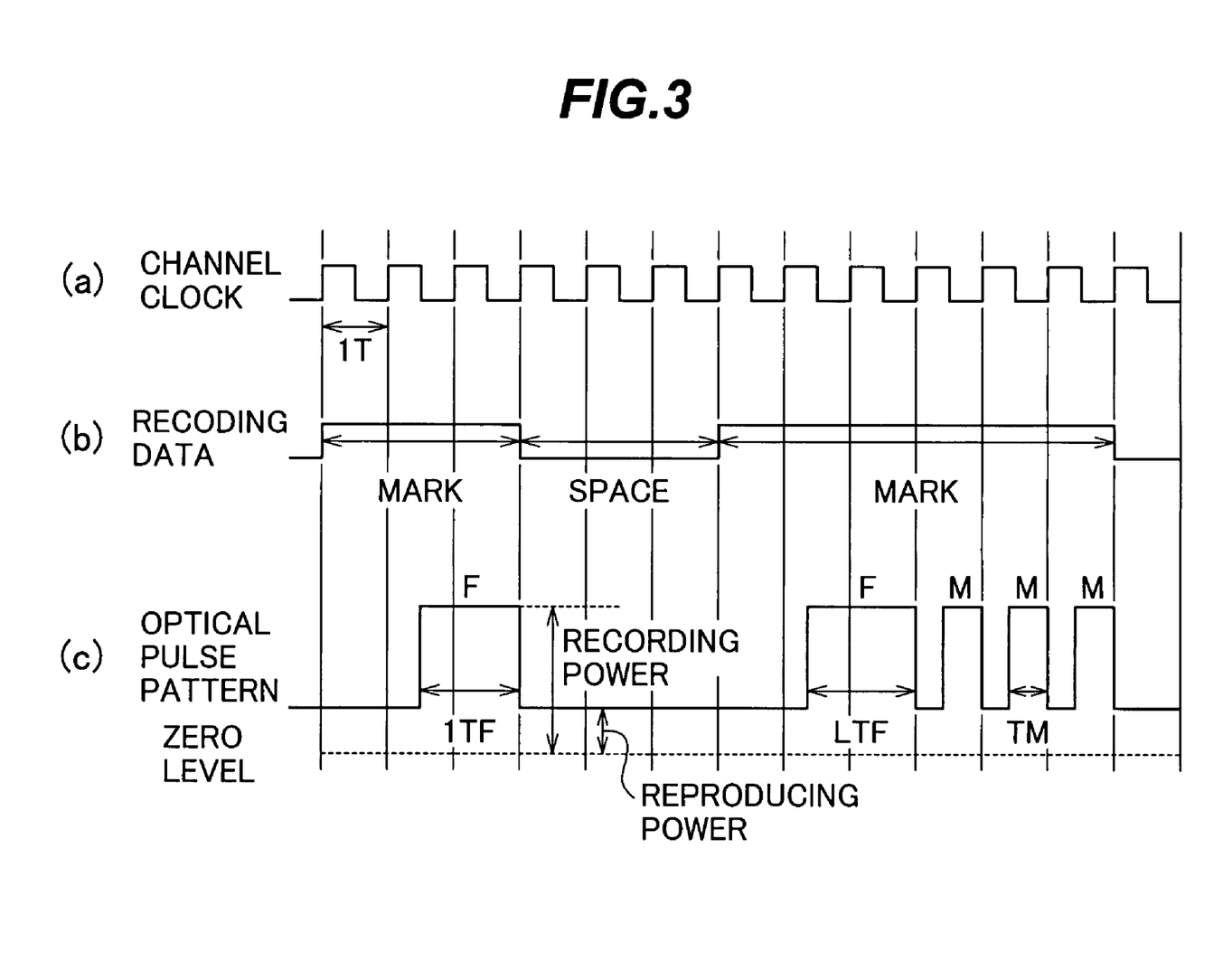
FIG. 3 shows examples of write strategies generated in the optical recording and reproducing device in the first embodiment of this invention when the optical disk is a medium of the dye type.

FIG. 3 shows an example of a write strategy generated in the laser waveform controller 240 in the optical recording and reproducing apparatus 100 shown in FIG. 1 when the optical disk 160 is a medium of the dye type. FIG. 3(a) shows a channel clock having period T. FIG. 3(b) shows recording data comprising marks and spaces. FIG. 3(c) shows the write strategy, i.e., the emitted optical pulse pattern, for recording the data in FIG. 3(b). In the emitted optical pulse pattern, the level is changed between the recording power level and reproducing power level, and the width of each pulse is defined as the period spent at the recording power level.

The shortest mark has a length corresponding to 3T, while the longest mark has a length corresponding to 14T.

FIG. 3(b) and FIG. 3(c) show a case in which the shortest mark is recorded, then the fourth-shortest mark is recorded.

As shown at the left in FIG. 3(c), when the recorded data are the shortest mark, the write strategy consists only of a leading pulse F having pulse width 1TF.

As shown at the right in FIG. 3(c), recording the fourth shortest mark, the write strategy consists of a leading pulse F having pulse width LTF, followed by three multi-pulses M.

The write strategy recording the n-th shortest mark (4<n<10, having a length corresponding to (n+2)T) consists of a leading pulse F having pulse width LTF, followed by (n−1) multi-pulses M.

The write strategy recording the longest mark (a mark having length 14T) consists of a leading pulse F having pulse width LTF, followed by eleven multi-pulses M.

As shown, the marks from the fourth shortest mark to the longest mark have the same leading pulse width LTF.

The write strategy recording the second shortest mark consists of a leading pulse F having pulse width 2TF, followed by one multi-pulse M.

The write strategy recording the third shortest mark consists of the leading pulse having pulse width 3TF, followed by two multi-pulses M.

The width of the multi-pulse M is the same in all of the cases above.

During reproducing and writing operations by the semiconductor laser 110, the central controller 250 controls the device as a whole. The central controller 250 receives reproduced data from the data decoder 200, pre-pit information from the pre-pit detector 210, and an asymmetry value from the asymmetry detector 220, and provides control signals to the data encoder 230, the laser waveform controller 240, and the laser driver 120.

In particular, the central controller 250 controls the determination of the write strategy, especially the calculation of pulse widths and the asymmetry value, and trial writing performed by use of the modified write strategy and asymmetry value, as will be described later with reference to FIGS. 4 and 5.

The central controller 250 comprises, for example, a central processing unit (CPU), a program memory such as a read-only memory (ROM), for example, storing programs for the operation of the CPU, and a data memory such as a random-access memory (RAM), for example, for storing data. The program memory stores data representing the characteristics of the optical system of the optical pickup of the optical recording and reproducing apparatus 100, a standard numerical aperture NA1, constants (Ki, Ci, Di) for various calculations described later, and a comparison threshold value ($\Delta\lambda$·t). The stored characteristics of the optical system include in particular the wavelength $\lambda 2$ of the laser beam emitted from the semiconductor laser 110, and the numerical aperture NA2 of the objective lens 150 of the optical pickup. The program stored in the program memory specifically includes a section defining formulas for determining the write strategy and formulas for determining the asymmetry value, as described later with reference to FIGS. 4 and 5.

It is a general practice to optimize the recording power by performing trial writing before recording information. The procedure will be described below.

First, trial writing on the optical disk 160 is performed by use of a test pattern comprising 3T-11T spaces and marks corresponding to random recording data, for example, under varied recording power; next, the area on the optical disk 160 on which this test pattern has been recorded is reproduced, the asymmetry value is detected by the asymmetry detector 220, and the detected asymmetry value is compared with a target asymmetry value in the central controller 250 to obtain the optimal recording power.

In general, the higher the recording power, the higher the asymmetry value, and the lower the recording power, the lower the asymmetry value.

The central controller 250 compares the detected asymmetry values corresponding to a plurality of mutually differing recording powers with the target asymmetry value, and sets the optimal recording power as the recording power that generated a detected value nearest to the target value.

Alternatively, the trial writing on the optical disk 160 may be performed at one recording power, the data may be reproduced, the asymmetry value may be detected from the reproduced data, the detected asymmetry value may be compared with the target asymmetry value, and the recording power may be increased or decreased responsive to the comparison result to find the optimal value.

Within this basic information recording method, in the present invention, the pulse width of the leading pulse in the light-emitting write strategy for recording is obtained by a calculation based on the recommended write strategy parameters recorded on the optical disk 160 and the characteristics of the optical system of the optical pickup of the optical recording device used in recording; then the calculated pulse width is used in recording.

Next, the procedure for the optical recording method of this embodiment will be described with reference to FIG. 4.

First, when the optical disk to be used in recording is inserted in the optical recording device, in step S1, the recommended write strategy and recording condition parameters, i.e., the recommended values iTP (i=1, 2, 3, L) of the leading pulse width of the write strategy for recording each mark, the recommended asymmetry value $\beta 1$, and the recommended wavelength $\lambda 1$ are read (step S1).

The recommended write strategy parameters include the recommended value of the leading pulse width of the write strategy for recording each mark. As the recommended values iTP of the leading pulse width, at least the following values are read:

a recommended pulse width 1TP of the leading pulse F for recording the shortest mark;

a recommended pulse width 2TP of the leading pulse F for recording the second shortest mark;

a recommended pulse width 3TP of the leading pulse F for recording the third shortest mark; and a recommended pulse width LTP of the leading pulse F for recording marks from the fourth shortest mark to the longest mark.

The recommended asymmetry value $\beta 1$ is the target value used to determine the recording power in the trial writing.

The recommended wavelength $\lambda 1$ is the laser wavelength under the recording conditions of the recommended write strategy parameters of the optical disk 160.

Next, in step S2, the write strategy to be used in recording is determined based on the recommended write strategy parameters that were read and the characteristics of the optical system of the optical pickup of the optical recording device used in recording (S2). Details will be given later.

Next, in step S3, the asymmetry value β2 to be used in recording is calculated according to the following formula (2), based on the wavelength λ1 read in step S1, the numerical aperture NA1 used for determining the recommended write strategy parameter and the recommended asymmetry value β1, and the numerical aperture NA2 of the objective lens 150 of the optical recording and reproducing apparatus 100 used in recording (S3).

$$β2=β1+E×(NA2-NA1) \quad (2)$$

The numerical aperture NA1 is known; data representing the numerical aperture NA1 are prestored in a non-volatile memory comprising ROM, for example, in the central controller 250. Data representing the numerical aperture NA2 of the objective lens 150, the wavelength λ2 of the laser beam, and the constant E have also been stored in the non-volatile memory in the central controller 250; these data are read and used for the calculation according to formula (2).

Next, when a recording command is received, trial writing on the optical recording medium is performed in step S4, using the write strategy parameters and asymmetry value obtained as above. That is, the write strategy determined in step S2 is set in the laser waveform controller 240, which in turn generates write strategies based on the test pattern to perform trial writing to the optical disk 160. At this time, the asymmetry value β2 obtained as above is used as a target value. That is, the optimal recording power is determined by reproducing the area on the optical disk 160 on which the test pattern has been recorded, comparing the asymmetry value detected by the asymmetry detector 220 with the asymmetry value β2 calculated in step S3, and performing control to make the two values match.

Then, after this trial writing has been performed and the power has been adjusted, the adjusted recording power, the write strategy obtained in step S2, and the asymmetry value calculated in step S3 are used in step S5 to record data. That is, the write strategy determined in step S2 is set in the laser waveform controller 240, which in turn, generates write strategies based on the recording data, and performs writing onto the optical disk 160 with the recording power determined in step S4.

Once the write strategy determined in step S2 has been set in the laser waveform controller 240 in FIG. 1, when the central controller 250 specifies one of 3T to 11T or 14T, a write strategy signal corresponding to the specified value is output from laser waveform controller 240.

Figure 4:
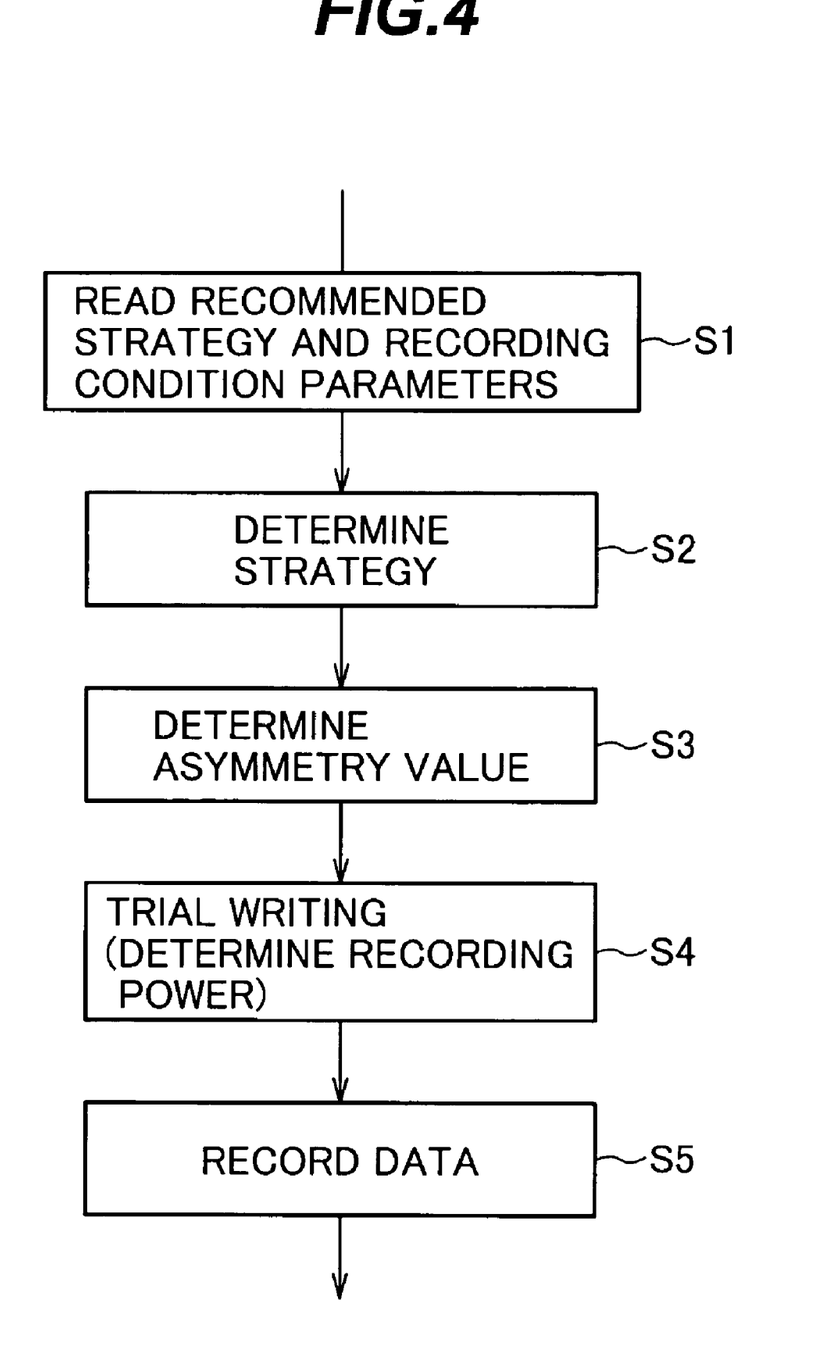
FIG. 4 is a flowchart illustrating the recording procedure in the optical recording and reproducing device in the first embodiment of this invention.
Figure 5:
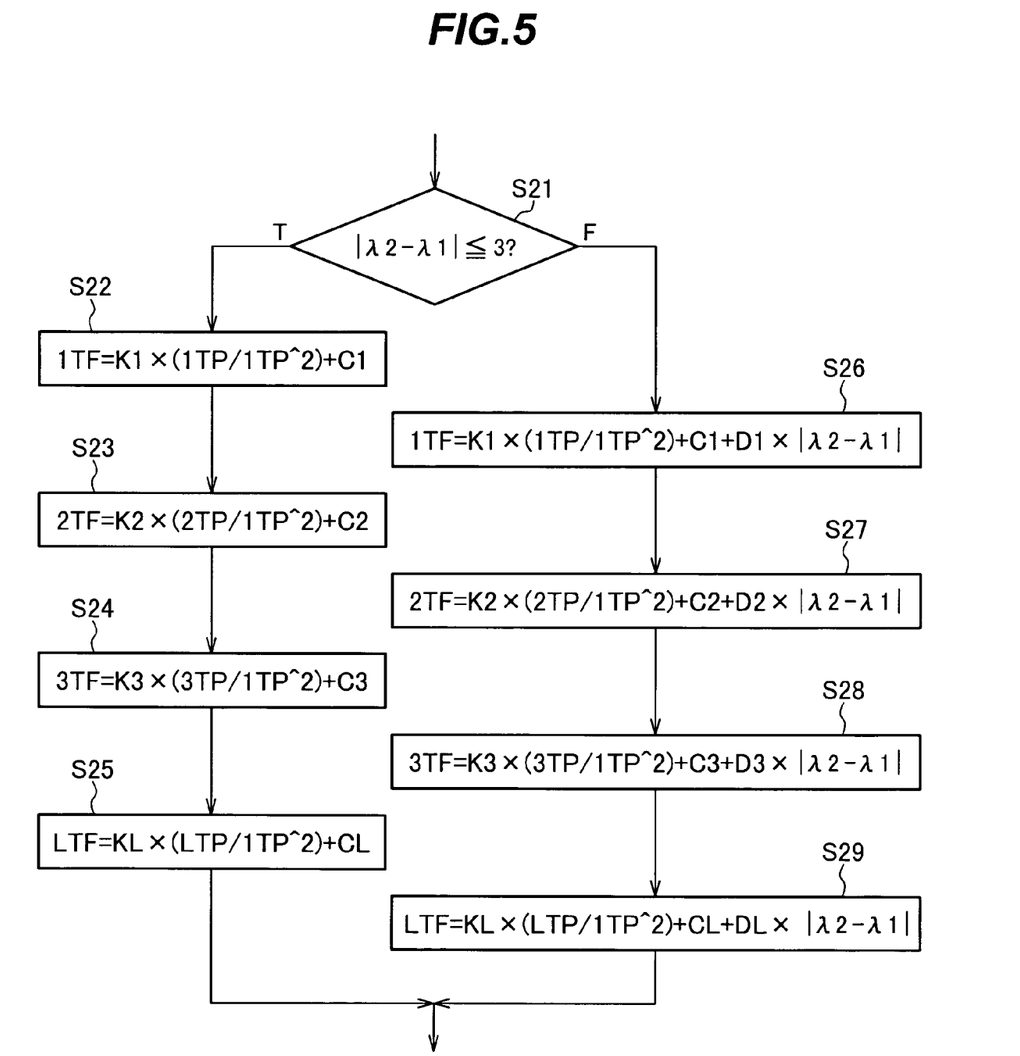
FIG. 5 is a flowchart for calculating the write strategy from recommended write strategy parameters recorded on an optical disk in the optical recording and reproducing device in the first embodiment of this invention.
Figure 6:
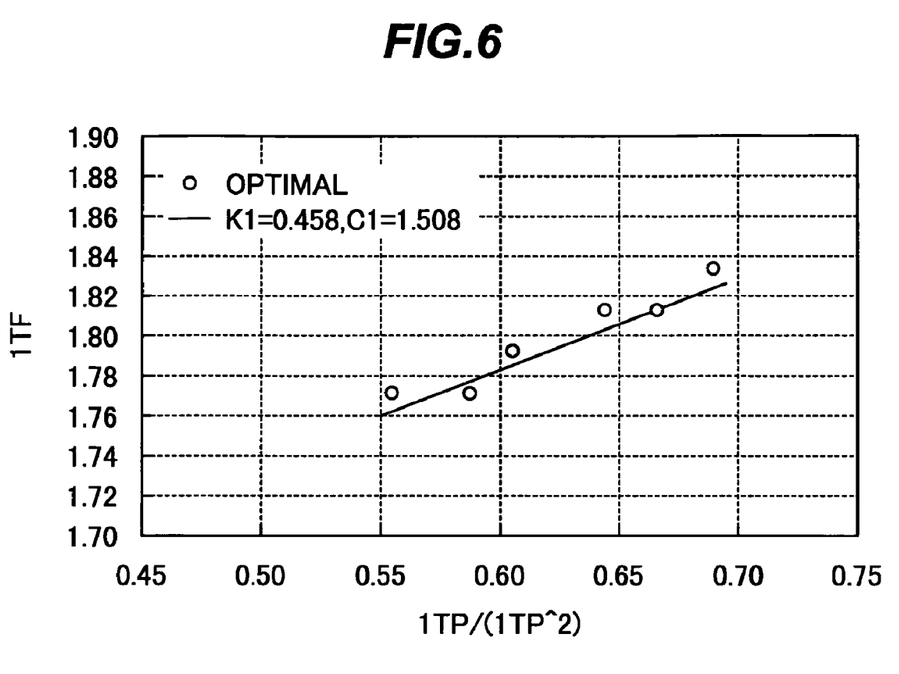
FIG. 6 illustrates the relationship between the pulse width 1TF and the recommended write strategy parameter ratio 1TP/(1TP^2) in the optical recording and reproducing device in the first embodiment of this invention.
Figure 7:
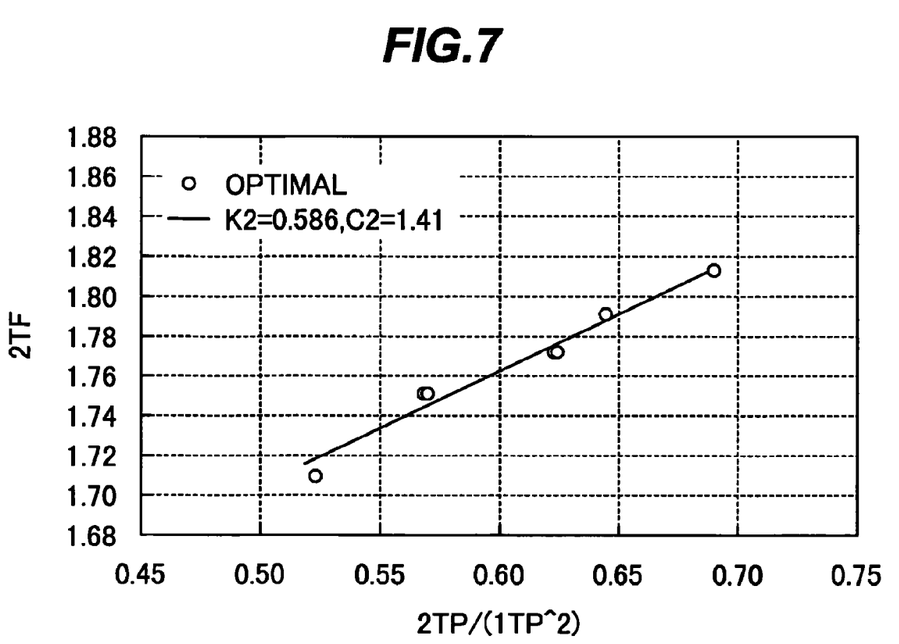
FIG. 7 illustrates the relationship between the pulse width 1TF and the recommended write strategy parameter ratio 2TP/(1TP^2) in the optical recording and reproducing device in the first embodiment of this invention.
Figure 8:
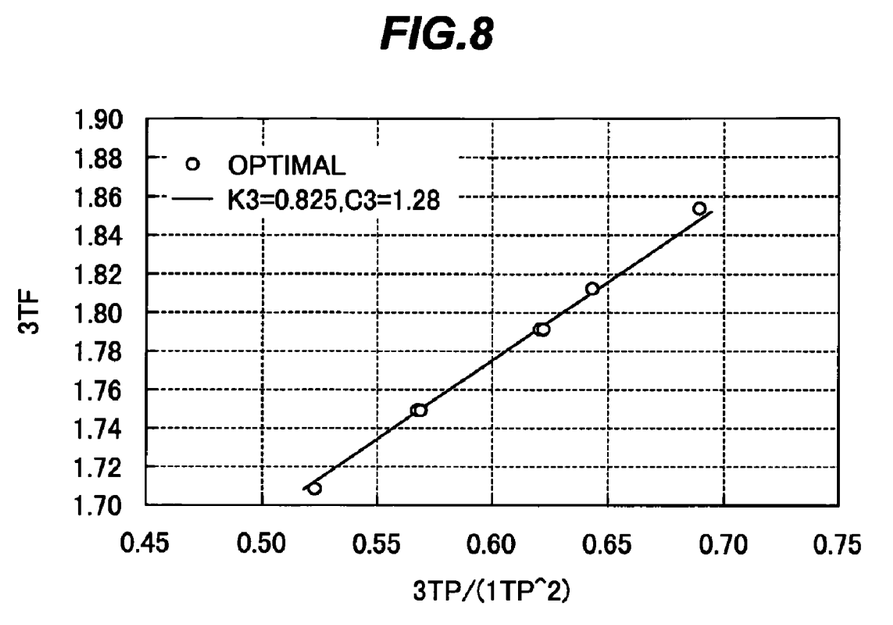
FIG. 8 illustrates the relationship between the pulse width 1TF and the recommended write strategy parameter ratio 3TP/(1TP^2) in the optical recording and reproducing device in the first embodiment of this invention.
Figure 9:
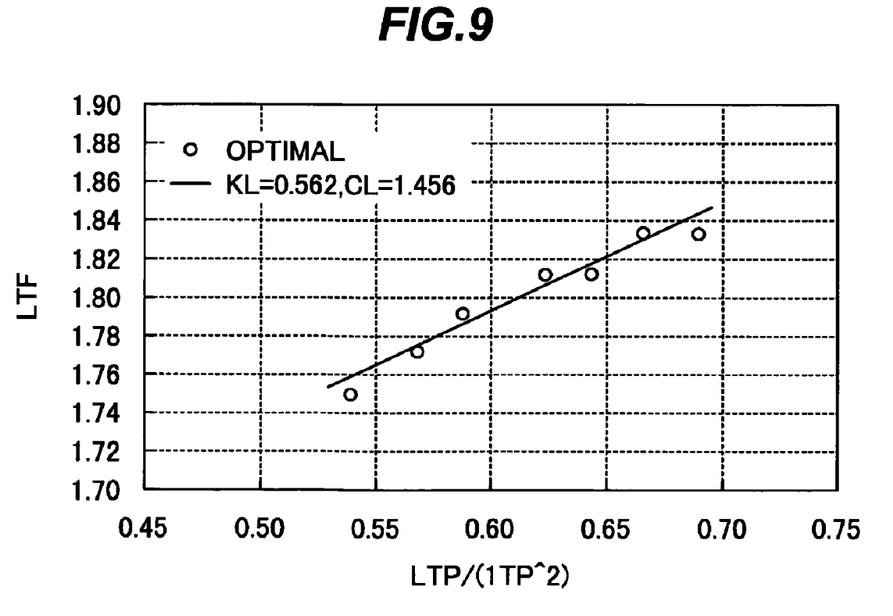
FIG. 9 illustrates the relationship between the pulse width 1TF and the ratio recommended write strategy parameter LTP/(1TP^2) in the optical recording and reproducing device in the first embodiment of this invention.

FIG. 5 shows the determination process in step S2 in FIG. 4 in more detail.

First, in step S21 in FIG. 5, from the recommended wavelength λ1 obtained in step S1 and the wavelength λ2 of the laser beam emitted by the semiconductor laser 110 of the optical recording and reproducing apparatus 100, the absolute value of (λ2−λ1) is calculated; if the absolute value of (λ2−λ1) is less than a predetermined threshold Δλt, such as 3 nm, for example, the process proceeds to steps S22 to S25; if the absolute value of (λ2−λ1) is greater than the predetermined threshold value Δλt of 3 nm, for example, the process proceeds to steps S26 to S29.

In step S22, the pulse width 1TF of the leading pulse F for recording the shortest mark is calculated from the recommended pulse width 1TP obtained in step S1 and constants K1 and C1, by use of the following formula (3).

$$1TF=K1×(1TP/1TP^2)+C1 \quad (3)$$

(The notation '1TP^2' represents the square of 1TP in this specification).

In step S23, the pulse width 2TF of the leading pulse F for recording the second shortest mark is calculated from the recommended pulse widths 1TP and 2TP obtained in step S1 and constants K2 and C2, by use of the following formula (4).

$$2TF=K2×(2TP/1TP^2)+C2 \quad (4)$$

In step S24, the pulse width 3TF of the leading pulse F for recording the third shortest mark is calculated from the recommended pulse widths 1TP and 3TP obtained in step S1 and constants K3 and C3, by use of the following formula (5).

$$3TF=K3×(3TP/1TP^2)+C3 \quad (5)$$

In step S25, the pulse width LTF of the leading pulse F for recording the marks from the fourth shortest mark to the longest mark is calculated from the recommended pulse widths 1TP and LTP obtained in step S1 and constants KL and CL, by use of the following formula (6).

$$LTF=KL×(LTP/1TP^2)+CL \quad (6)$$

Formulas (3) to (6) can be generalized as follows:

$$iTF=Ki×(iTP/1TP^2)+Ci(i=1, 2, 3, L)$$

In step S26, the pulse width 1TP of the leading pulse F for recording the shortest mark is calculated from the recommended pulse width 1TP obtained in step S1 and constants K1, C1, and D1, by use of the following formula (7).

$$1TF=K1×(1TP/1TP^2)+C1+D1×|λ2-λ1| \quad (7)$$

In step S27, the pulse width 2TF of the leading pulse F for recording the second shortest mark is calculated from the recommended pulse widths 1TP and 2TP obtained in step S1 and constants K2, C2, and D2, by use of the following formula (8).

$$2TF=K2×(2TP/1TP^2)+C2+D2×|λ2-λ1| \quad (8)$$

In step S28, the pulse width 3TF of the leading pulse F for recording the third shortest mark is calculated from the recommended pulse widths 1TP and 3TP obtained in step S1 and constants K3, C3 and D3, by use of the following formula (9).

$$3TF=K3×(3TP/1TP^2)+C3+D3×|λ2-λ1| \quad (9)$$

In step S29, the pulse width LTF of the leading pulse F for recording the marks from the fourth mark to the longest mark is calculated from the recommended pulse widths 1TP and LTP obtained in step S1 and constants KL, CL and DL, by use of the following formula (10).

$$LTF=KL×(LTP/1TP^2)+CL+DL×|λ2-λ1| \quad (10)$$

Formulas (7) to (10) can be generalized as follows:

$$iTF=Ki×(iTP/1TP^2)+Ci+Di×|λ2-λ1|(i=1, 2, 3, L)$$

The data representing the constants K1 to KL, C1 to CL, and D1 to DL used in the above steps S22 to S29 are stored in the non-volatile memory in the central controller 250. These data are read out for use in the calculations according to formulas (3) to (10).

As stated above, in step S2 the leading pulse widths of the write strategy used in recording are determined from the leading pulse widths in the recommended write strategy parameters read from the optical disk. In other words, the recommended write strategy parameters are not used as is, but are modified. The reason is as follows.

The recommended write strategy parameters, recommended asymmetry value, and laser wavelength are recorded in a predetermined area on the optical disk as described above, but when the numerical aperture NA1 of the objective lens under the recording conditions when the recommended write strategy parameters were recorded differs from the numerical aperture NA2 of the objective lens 150 of the optical recording and reproducing apparatus 100 used in recording, if the recording power is determined by using the recorded recommended write strategy parameters and asymmetry value, the amount of heat supplied to the optical disk 160 and its distribution differ due to the difference in the numerical aperture. Therefore, the size and location of the pits formed corresponding to each mark length differ, and jitter is worsened. The shift in the locations at which the pits are formed has a particularly large effect on the jitter. The write strategy is therefore modified or optimized to compensate for the difference in recording conditions, particularly for the difference in numerical apertures.

In steps S26 to S29, the pulse widths 1TF, 2TF, 3TF, and LTF of the leading pulse F of the write strategy for recording the shortest mark, the second shortest mark, the third shortest mark, and marks from the fourth shortest mark to the longest mark, respectively, are calculated by adding values obtained from the formula $$Di \times |(l2-l1)| (i=1, 2, 3, L) \quad (11)$$

This is done to compensate for sensitivity reduction due to wavelength sensitivity dependence, e.g., the wavelength sensitivity dependence of the dye-type medium.

In the above step S3, the asymmetry value $\beta 2$ used in recording is calculated in the above step S3 based on the recommended asymmetry value $\beta 1$ read from the optical disk. In other words, the asymmetry value $\beta 1$ recorded on the optical disk is modified before being used. The reason for this is as follows.

The difference in the numerical apertures as above causes a difference in the detected asymmetry value. For example, when NA1<NA2, i.e., the numerical aperture NA2 of the objective lens 150 of the optical recording and reproducing apparatus 100 used in recording is greater than the numerical aperture NA1 of the objective lens in the recording conditions under which the recommended asymmetry value was recorded on the optical disk 160, the asymmetry value detected with an objective lens having numerical aperture NA2 has a larger value than the asymmetry value detected with an objective lens having numerical aperture NA1. Therefore, if recording is performed with an objective lens having a numerical aperture NA2 with a target value equal to the recommended asymmetry value $\beta 1$, the detected asymmetry value will have a higher value than the actual value, due to the difference in the numerical aperture, and recording will be performed with an asymmetry value smaller than the recommended asymmetry value $\beta 1$. Therefore, when recording is performed with an objective lens having a numerical aperture NA2, the target is preferably set to a higher value than the recommended asymmetry value $\beta 1$.

Next, the above procedure will be described in detail. First, the optimization of the write strategy will be described. It would be preferable if the correction for optimization could be performed by a mathematical formula, but it was not clear what formula to use.

Therefore, the inventors conducted a variety of experiments to find conditions with minimum reproducing jitter, when the recording conditions of the optical recording device used in recording differ from the recording conditions used in determining the recommended write strategy parameters. One of the experiments performed was directed toward the relationship between reproducing jitter and the widths of the leading pulses of the write strategy (other conditions being fixed) to find the leading pulse widths that would minimize reproducing jitter.

As a result, a linear relationship was found between the leading pulse width iTF(o) that minimizes reproducing jitter (the pulse width that minimizes reproducing jitter may also be referred to as the optimal pulse width or optimal value of the pulse width) and the ratio of the recommended pulse width parameter iTP to the square ($1TP^2$) of the recommended leading pulse width parameter of the write strategy for recording the shortest mark (hereinafter, also referred to as the ($iTP/1TP^2$) ratio or normalized pulse width); from a regression analysis conducted on the data obtained in the experiment, it was found that this relationship can be approximated by a line represented by the following formula (12). The parameters iTP and 1TP are represented as multiples of the period of the channel clock. Ki and Ci (i=1, 2, 3, or L) are constants.

$$iTF(o) = Ki \times (iTP/1TP^2) + Ci \quad (12)$$

Formula (12) can be rewritten as follows.
For the shortest mark, in which i=1, $$1TF(o) = K1 \times X1 + C1 \quad (13)$$

For the second shortest mark, in which i=2, $$2TF(o) = K2 \times X2 + C2 \quad (14)$$

For the third shortest mark, in which i=3, $$3TF(o) = K3 \times X3 + C3 \quad (15)$$

For the fourth shortest mark, in which i=L, $$LTF(o) = KL \times XL + CL \quad (16)$$

FIGS. 6 to 9 show lines obtained by the above formulas for the write strategies used to record the shortest mark, the second shortest mark, the third shortest mark, and the marks from the fourth shortest mark to the longest mark, respectively.

The slopes Ki and the intercepts on the vertical axis Ci (i=1, 2, 3, L) of the lines shown in the FIGS. 6 to 9 are as follows.
K1=0.458
C1=1.508
K2=0.586
C2=1.41
K3=0.825
C3=1.28
KL=0.562
CL=1.456

In FIGS. 6 to 9, the values of the leading pulse width that minimized the reproducing jitter, namely, the optimal values iTF(o) (o=1, 2, 3 or L) of the leading pulse width, are indicated by circles for various values of ($iTP/1TP^2$). As shown in the drawings, the deviation of the optimal values from the approximation line (the approximation error) is small.

The experiments from which the results in FIGS. 6 to 9 were obtained were conducted under the following conditions. The numerical aperture NA1 of the objective lens in the recording conditions under which the recommended write strategy parameters were recorded on the optical disk 160 was 0.60, the numerical aperture NA2 of the objective lens 150 of the optical recording and reproducing apparatus 100 used in the experiments was 0.64, and the wavelength $\lambda 2$ of the semiconductor laser 110 was 657 nm.

As described above, for a particular optical recording device, it was found that favorable results can be obtained when the constants are set as above.

The invention is not limited to the above values, however; it is thought that satisfactory results will be obtained if coefficient K1 is set to a value in the vicinity of 0.46, constant C1 to a value in the vicinity of 1.51, coefficient K2 to a value in the vicinity of 0.59, constant C2 to a value in the vicinity of 1.41, coefficient K3 to a value in the vicinity of 0.83, constant C3 to a value in the vicinity of 1.28, coefficient KL to a value in the vicinity of 0.56, and constant CL to a value in the vicinity of 1.46.

Also as described above, the optimal pulse width (the width of the leading pulse in the write strategy) is affected by the wavelength used in recording, so if the wavelength of the optical recording device differs from the wavelength in the recording conditions under which the recommended write strategy parameters were determined, the wavelength difference should be taken into consideration when the pulse widths to be used in recording are determined. In this embodiment, when the difference between the wavelengths is greater than a threshold value Δλt such as 3 nm, for example, (giving a result of "F" in step S21), a correction determined according to the wavelength difference is added (steps S26 to S29).

This correction can be determined according to the following formulas (17) to (20).

$$D1 \times |(\lambda 2 - \lambda 1)| \quad (17)$$

$$D2 \times |(\lambda 2 - \lambda 1)| \quad (18)$$

$$D3 \times |(\lambda 2 - \lambda 1)| \quad (19)$$

$$DL \times |(\lambda 2 - \lambda 1)| \quad (20)$$

It was found that, for the particular optical recording device, the coefficients D1, D2, D3 and DL should all be set to 0.032.

As described above, for a certain optical recording device, it was found that favorable results are obtained when the constants D1, D2, D3 and DL are set as above.

The invention is not limited to the above values, however; it is thought that satisfactory results can be obtained by setting the above constant Di to a value in the vicinity of 0.03, for example.

Furthermore, different values may be used for D1, D2, D3 and DL, instead of the same value being used as above.

It was also found that when |λ2−λ1| is equal to or less than 3 nm (giving a result of "F" in step S21), the addition operation may be omitted, because 3 nm is within the range of wavelength measurement error, and because the effect of adding Di×|λ2−λ1| is minor. This is the reason why the addition of Di×|λ2−λ1| is not performed in steps S22 to S25 in FIG. 5.

Next, the modification of the asymmetry value will be described.

As noted above, the optimal asymmetry value is affected by the numerical aperture of the optical recording device used in recording, so when the numerical aperture of the optical recording device differs from the numerical aperture in the recording conditions under which the recommended write strategy was determined, the numerical aperture should be taken into account in determining the asymmetry value to be used in recording. In this embodiment, a correction determined from the difference between the numerical apertures is added to the recommended asymmetry value β1 to obtain an asymmetry value β2 to be used in recording. Specifically, it was found appropriate to use the above formula (2).

$$\beta 2 = \beta 1 + E \times (NA2 - NA1) \quad (2)$$

This is the reason why formula (2) is used in step S3 in FIG. 4.

Figure 10:
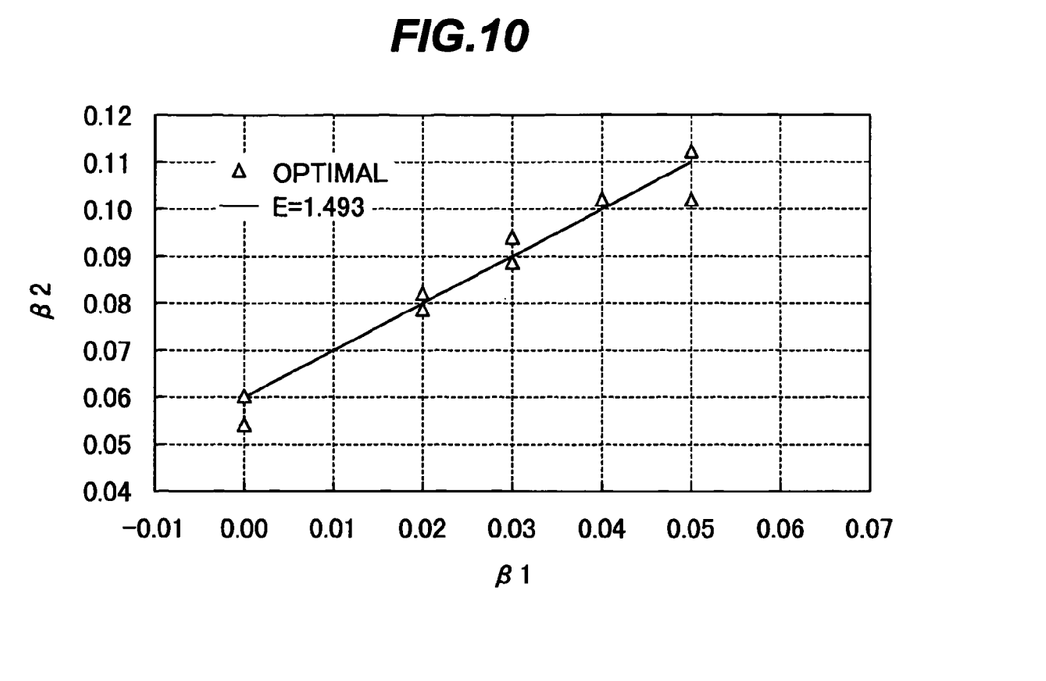
FIG. 10 illustrates the relationship between the recommended asymmetry value β1 recorded on the optical disk and the asymmetry value β2 used in recording in the first embodiment of this invention.

The triangles in FIG. 10 indicate the values of the asymmetry value β2 that minimize the reproducing jitter in a certain optical recording and reproducing apparatus 100 for a plurality of optical disks having mutually differing recommended asymmetry value β1, and the straight line indicates the asymmetry value β2 obtained from formula (2) with E=1.493. As shown in FIG. 10, the asymmetry values (optimal asymmetry values) that minimize the reproducing jitter can be linearly approximated by use of formula (2).

As described above, it was found that for a certain optical recording device, good results are obtained if the value of constant E is set as above.

The invention is not limited to the above values, however; it is thought that satisfactory results will be obtained if the coefficient E is set to a value in the vicinity of 1.5.

Figure 11:
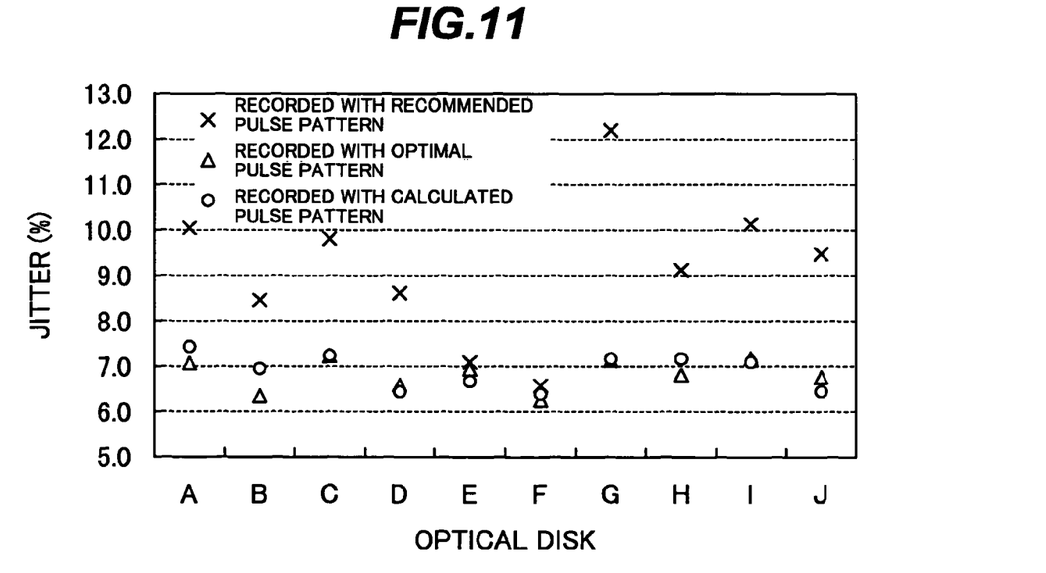
FIG. 11 illustrates the relationship between jitter value and the write strategy used in recording in the optical recording and reproducing device in the first embodiment of this invention.

FIG. 11 shows reproducing jitter when three pulse patterns were used for recording on each of ten types of optical disks A to J.

The X marks in FIG. 11 indicate the reproducing jitter when recording was performed using the recommended write strategy parameters recorded on each optical disk.

The triangular marks indicate the reproducing jitter when recording was performed using the optimized write strategy parameters adjusted so as to obtain optimal reproducing jitter for each optical disk.

The circles indicate the reproducing jitter when recording was performed using the recommended write strategy parameters modified according to the above formulas (2) to (10).

The constants in formulas (2) to (10) in this case were set as follows: K1=0.458, C1=1.508, K2=0.586, C2=1.41, K3=0.825, C3=1.28, KL=0.562 CL=1.456, E=1.493.

In FIG. 11, better reproducing jitter could be obtained on all the disks when recording was performed using the corrected recommended write strategy parameters (as indicated by the circles) than when recording was performed using the recommended write strategy parameters recorded on each optical disk (as indicated by the X's). When recording was performed using the corrected recommended write strategy parameters (as indicated by the circles), it was possible to obtain nearly the same good reproducing jitter as when recording was performed using the optimal write strategy (as indicated by the triangles).

Thus according to the present embodiment, recording can be performed using optimal write strategies and asymmetry values responsive to the characteristics of the optical system of the optical pickup of the optical recording device.

For example, the optical system conditions such as the numerical aperture and wavelength used in determining the recommended parameters recorded on an optical recording medium generally differ from the optical conditions of commercially available optical recording devices, but by taking account of the differences between the specifications of a commercially available optical recording device, particularly the specifications of the optical system of its optical pickup, and the specifications of the optical system used in determining the recommended parameters, it is possible to determine write strategy parameters and asymmetry values suitable for each optical recording device, and to perform recording with write strategies best suitable for each optical recording device.

The write strategies and asymmetry values suitable for each recording device can be calculated easily if attention is paid to the differences between optical recording devices, particularly differences in the characteristics of the optical systems of their optical pickups, more particularly optical system differences including the numerical apertures of their objective lenses, by experimentally determining the constants (Ki, Ci, Di, E) of the formulas used to determine the write strategies and asymmetry values, storing these constants in the optical recording device, in non-volatile memory in the central control unit, for example, and reading out and using these stored constants in recording.

The constants only need to be determined once for each type of optical recording device or set of specifications; the same constants can be applied to other optical recording devices of the same type or with the same specifications. Once constants have been determined for an optical recording device of a certain type or with certain specifications, other optical recording devices of the same type or with the same specifications can be shipped with the constants that have been determined set therein.

When the specifications of the optical recording and reproducing apparatus 100 are changed, the strategy conditions can be optimized easily by selecting or determining the constants (Ki, Ci, Di, E) in formulas (2) to (10) again.

In the optical recording method according to the first embodiment, because the recommended write strategy parameters and the recommended asymmetry value recorded on the optical disk 160 are calculated using formulas (2) to (10), it is possible to support recording by any recording and reproducing device on any recording medium without the need to store a large amount of strategy information.

Recording can furthermore be performed better than when the recommended write strategy parameters and recommended asymmetry value are used without modification, and nearly as well as when the optimal recommended optimal write strategy parameters for each optical disk are used. Good recording accordingly can be performed on an optical disk for which the optimal write strategy information is not known beforehand.

To simplify the calculations, in the above embodiment $Di\times|\lambda1-\lambda2|$ is not added when $|\lambda2-\lambda1|$ is less than the threshold value $\Delta\lambda t$, but when $|\lambda2-\lambda1|$ is small, adding it will have little effect on the result, so it may be added.

Also, the wavelength difference need not be taken into consideration, and the corrections according to formulas (17) to (20) need not be added.

Furthermore, the correction of the asymmetry value according to the difference between numerical apertures can be omitted.

In the above embodiment, the pulse width of the leading pulse in the write strategy used in recording the fourth shortest mark is also used in all the write strategies from the write strategy used in recording the fifth shortest mark to the write strategy used in recording the longest mark, but the invention can also be applied when different pulse widths are set for each mark.

In the above embodiment, in determining the write strategy, the width of the leading pulse for recording each mark of the write strategy is calculated based on the ratio ($iTP/1TP^2$) of the recommended width parameter (iTP) of the leading pulse for recording each mark (the i-th shortest mark) included in the recommended write strategy parameters with respect to the square ($1TP^2$) of the recommended width parameter (1TP) of the leading pulse for recording the shortest mark included in the recommended write strategy parameters. Then the pulse widths of the leading pulses in the write strategy are changed. However, other parts of the write strategy can be changed.

The formulas used for determining the write strategy are not limited to formulas including the above ratio ($iTP/1TP^2$).

What is claimed is:

1. An optical recording method comprising the steps of:
    reading recommended write strategy parameters and a recommended asymmetry value from an optical recording medium on which the recommended write strategy parameters and recommended asymmetry value have been recorded;
    determining a pulse width of write strategy parameters to be used in recording, based on the recommended write strategy parameters and characteristics of an optical system of an optical pickup of an optical recording device used in recording, and the determined pulse width being calculated using a predetermined calculation formula;
    determining an asymmetry value to be used in recording, based on the recommended write strategy parameters and characteristics of the optical system of the optical pickup of the optical recording device used in recording, the determined asymmetry value being calculated using a predetermined calculation formula;
    determining an optimal recording power based upon the determined pulse width of the write strategy parameters and the determined asymmetry value; and
    writing to the optical recording medium by use of the optical recording device, using a write strategy having both the determined pulse width and the optimal recording power thus determined,
    wherein determining a pulse width includes calculating a leading pulse width as the pulse width of the write strategy parameters for recording each mark, based on a ratio of a recommended leading pulse width parameter of the write strategy for recording each mark included in the recommended write strategy parameters with respect to the square of the recommended leading pulse width parameter of the write strategy for recording the shortest mark included in the recommended write strategy parameters.

2. The optical recording method of claim 1, wherein:
    the write strategy is a multiple-pulse type of write strategy.

3. The optical recording method of claim 2, wherein said step of determining a pulse width is carried out by a computation using, as the predetermined calculation formula, a formula predetermined for the optical recording device used in recording.

4. The optical recording method of claim 3, wherein in regard to the write strategy for recording each mark of the write strategy, the leading pulse width that minimizes reproducing jitter is determined experimentally, a formula is generated such that the experimentally determined leading pulse width is the result of a calculation or a value approximating the result of the calculation, and
    the generated formula is used in said step of determining.

5. The optical recording method of claim 3, wherein the formula is expressed as $$iTF = Ki\cdot(iTP/1TP^2) + Ci$$

(where iTF is the pulse width of the leading pulse in the write strategy to be used in recording an i-th shortest mark,
iTP is the pulse width of the leading pulse in the recommended write strategy parameters for recording the i-th shortest mark, 1TP is the pulse width of the leading pulse in the recommended write strategy parameters for recording the shortest mark, and Ki and Ci are constants for determining the write strategy to be used to record the i-th shortest mark).

6. The optical recording method of claim 3, wherein:

the reading step reads the recommended wavelength from the optical recording medium; and the formula is expressed as $$iTF = Ki \cdot (iTP/1TP^2) + Ci + Di \times |\lambda2 - \lambda1|$$

(where iTF is the pulse width of the leading pulse in the write strategy to be used in recording an i-th shortest mark, iTP is the pulse width of the leading pulse in the recommended write strategy parameters for recording the i-th shortest mark, 1TP is the pulse width of the leading pulse in the recommended write strategy parameters for recording the i-th shortest mark, $\lambda2$ is the wavelength of a laser beam of the optical recording device used in recording, $\lambda1$ is a recommended wavelength, and Ki, Ci, and Di are constants for determining the write strategy to use to record the i-th shortest mark).

7. The optical recording method of claim 3, wherein:

the step of reading reads the recommended wavelength from the optical recording medium; and the formula is expressed as $$iTF = Ki \cdot (iTP/1TP^2) + Ci, \text{ when the value of } |\lambda2-\lambda1| \text{ is equal to or less than a predetermined value, and}$$

$$iTF = Ki \cdot (iTP/1TP^2) + Ci + Di \times |\lambda2-\lambda1|, \text{ when the value of } |\lambda2-\lambda1| \text{ is greater than the predetermined value,}$$

(where iTF is the pulse width of the leading pulse in the write strategy to be used in recording an i-th shortest mark, iTP is the pulse width of the leading pulse in the recommended write strategy parameters for recording the i-th shortest mark, 1TP is the pulse width of the leading pulse in the recommended write strategy parameters for recording the i-th shortest mark, $\lambda2$ is the wavelength of a laser beam of the optical recording device used in recording, $\lambda1$ is a recommended wavelength, and Ki, Ci, and Di are constants for determining the write strategy to be used to record the i-th shortest mark).

8. The optical recording method of claim 6, wherein Di is the same for every i.

9. The optical recording method of claim 5, wherein the leading pulse width of the write strategy used in recording a fourth shortest mark is also used in all the write strategies from the write strategy used in recording a fifth shortest mark to the write strategy used in recording a longest mark.

10. The optical recording method of claim 1, wherein:

the step of reading reads a recommended wavelength value from the optical recording medium; and the step of determining performs a determination based on the recommended wavelength value and the wavelength of a laser beam of the optical recording device used in recording.

11. The optical recording method of claim 1, wherein:

the determining step calculates an asymmetry value for use in recording based on the recommended asymmetry value and the numerical aperture of the objective lens of the optical recording device used in recording; and the step of writing performs writing by use of the calculated asymmetry value.

12. The optical recording method of claim 11, wherein:

if the recommended asymmetry value recorded on the optical recording medium is $\beta1$, the numerical aperture of the objective lens used for determining the recommended value is NA1, and the numerical aperture of the objective lens of the optical recording device used in recording is NA2, then the asymmetry value $\beta2$ used in recording is calculated by the formula $$\beta2 = \beta1 + E \times (NA2 - NA1).$$

13. An optical recording device with an optical pickup having an optical system for recording and reproducing, comprising:

a reading means for reading recommended write strategy parameters and a recommended asymmetry value from an optical recording medium on which the recommended write strategy parameters and recommended asymmetry value have been recorded;

a determining means for determining a pulse width of write strategy parameters to be used in recording, based on the recommended write strategy parameters and characteristics of the optical system of the optical pickup, and the determined pulse width being calculated using a predetermined calculation formula, and for determining an asymmetry value to be used in recording, based on the recommended write strategy parameters and characteristics of the optical system of the optical pickup of the optical recording device used in recording, the determined asymmetry value being calculated using a predetermined calculation formula;

a determining means for determining an optimal recording power based upon the determined pulse width of the write strategy parameters and the determined asymmetry value; and a writing means for writing to the optical recording medium, using a write strategy having both the determined pulse width and the optimal recording power thus determined, wherein the determining means for determining a pulse width calculates a leading pulse width as the pulse width of the write strategy parameters for recording each mark, based on a ratio of a recommended leading pulse width parameter of the write strategy for recording each mark included in the recommended write strategy parameters with respect to the square of the recommended leading pulse width parameter of the write strategy for recording the shortest mark included in the recommended write strategy parameters.

14. The optical recording device of claim 13, wherein:

the write strategy is a multi-pulse type of strategy.

15. The optical recording device of claim 14, wherein the determining means carries out a computation using, as the predetermined calculation formula, a formula predetermined for the optical recording device used in recording.

16. The optical recording device of claim 15, wherein, in regard to the write strategy for recording each mark of the write strategy, the leading pulse width that minimizes reproducing jitter is determined experimentally, a formula is generated such that the experimentally determined leading pulse width is the result of a calculation or a value approximating the result of the calculation, and the determining means uses the formula to carry out the calculation.

17. The optical recording method of claim 7, wherein Di is the same for every i.

18. The optical recording method of claim 6, wherein the leading pulse width of the write strategy used in recording a fourth shortest mark is also used in all the write strategies from the write strategy used in recording a fifth shortest mark to the write strategy used in recording a longest mark.

19. The optical recording method of claim 7, wherein the leading pulse width of the write strategy used in recording a fourth shortest mark is also used in all the write strategies from the write strategy used in recording a fifth shortest mark to the write strategy used in recording a longest mark.

20. An optical recording method comprising the steps of:
reading recommended write strategy parameters from an optical recording medium on which the recommended write strategy parameters including recommended pulse width value have been recorded;
determining a pulse width of write strategy parameters including a leading pulse width parameter to be used in recording, based on the recommended pulse width value and characteristics of an optical system of an optical pickup of an optical recording device used in recording, the determined pulse width being calculated using a predetermined calculation formula; and
writing to the optical recording medium by use of the optical recording device, using a write strategy having the determined pulse width,
wherein the step of determining a pulse width includes calculating a leading pulse width as the pulse width of the write strategy parameters for recording each mark, based on a ratio of a recommended leading pulse width parameter of the write strategy for recording each mark included in the recommended write strategy parameters with respect to the square of the recommended leading pulse width parameter of the write strategy for recording the shortest mark included in the recommended write strategy parameters.

21. The optical recording method of claim 20, wherein:
the write strategy is a multiple-pulse type of write strategy.

22. The optical recording method of claim 21, wherein said step of determining a pulse width is carried out by a computation using, as the predetermined calculation formula, a formula predetermined for the optical recording device used in recording.

23. The optical recording method of claim 22, wherein in regard to the write strategy for recording each mark of the write strategy, the leading pulse width that minimizes reproducing jitter is determined experimentally, a formula is generated such that the experimentally determined leading pulse width is the result of a calculation or a value approximating the result of the calculation, and
the generated formula is used in said step of determining.

24. The optical recording method of claim 22, wherein the formula is expressed as $$iTF = Ki \cdot (iTP/1TP^2) + Ci$$

(where iTF is the pulse width of the leading pulse in the write strategy to be used in recording an i-th shortest mark,
iTP is the pulse width of the leading pulse in the recommended write strategy parameters for recording the i-th shortest mark,
1TP is the pulse width of the leading pulse in the recommended write strategy parameters for recording the shortest mark, and
Ki and Ci are constants for determining the write strategy to be used to record the i-th shortest mark).

25. The optical recording method of claim 22, wherein:
the reading step reads the recommended wavelength from the optical recording medium; and the formula is expressed as $$iTF = Ki \cdot (iTP/1TP^2) + Ci + Di \times |\lambda 2 - \lambda 1|$$

(where iTF is the pulse width of the leading pulse in the write strategy to be used in recording an i-th shortest mark,
iTP is the pulse width of the leading pulse in the recommended write strategy parameters for recording the i-th shortest mark,
1TP is the pulse width of the leading pulse in the recommended write strategy parameters for recording the i-th shortest mark,
$\lambda 2$ is the wavelength of a laser beam of the optical recording device used in recording,
$\lambda 1$ is a recommended wavelength, and
Ki, Ci, and Di are constants for determining the write strategy to use to record the i-th shortest mark).

26. The optical recording method of claim 22, wherein:
the step of reading reads the recommended wavelength from the optical recording medium; and
the formula is expressed as $$iTF = Ki \cdot (iTP/1TP^2) + Ci, \text{ when the value of } |\lambda 2 - \lambda 1| \text{ is equal to or less than a predetermined value, and}$$

$$iTF = Ki \cdot (iTP/1TP^2) + Ci + Di \times |\lambda 2 - \lambda 1|, \text{ when the value of } |\lambda 2 - \lambda 1| \text{ is greater than the predetermined value,}$$

(where iTF is the pulse width of the leading pulse in the write strategy to be used in recording an i-th shortest mark,
iTP is the pulse width of the leading pulse in the recommended write strategy parameters for recording the i-th shortest mark,
1TP is the pulse width of the leading pulse in the recommended write strategy parameters for recording the i-th shortest mark,
$\lambda 2$ is the wavelength of a laser beam of the optical recording device used in recording,
$\lambda 1$ is a recommended wavelength, and
Ki, Ci, and Di are constants for determining the write strategy to be used to record the i-th shortest mark).

27. The optical recording method of claim 24, wherein the leading pulse width of the write strategy used in recording a fourth shortest mark is also used in all the write strategies from the write strategy used in recording a fifth shortest mark to the write strategy used in recording a longest mark.

28. The optical recording method of claim 20, wherein:
the step of reading reads a recommended wavelength value from the optical recording medium; and
the step of determining performs a determination based on the recommended wavelength value and the wavelength of a laser beam of the optical recording device used in recording.

29. The optical recording method of claim 20, wherein:
the step of reading reads a recommended asymmetry value;
the determining step calculates an asymmetry value for use in recording based on the recommended asymmetry value and the numerical aperture of the objective lens of the optical recording device used in recording; and
the step of writing performs writing by use of the calculated asymmetry value.

30. The optical recording method of claim 20, wherein:
if the recommended asymmetry value recorded on the optical recording medium is $\beta 1$, the numerical aperture of the objective lens used for determining the recommended value is NA1, and the numerical aperture of the objective lens of the optical recording device used in recording is NA2, then the asymmetry value β2 used in recording is calculated by the formula $$\beta 2=\beta 1+E\times(NA2-NA1).$$

31. An optical recording device with an optical pickup having an optical system for recording and reproducing, comprising:

a reading means for reading recommended write strategy parameters including a recommended pulse width value from an optical recording medium on which the recommended write strategy parameters have been recorded;

a determining means for determining a pulse width of write strategy parameters including a pulse width value to be used in recording, based on the recommended pulse width value, and characteristics of an optical system of an optical pickup, the determined pulse width being calculated using a predetermined calculation formula; and a writing means for writing to the optical recording medium, using a write strategy having the determined pulse width, wherein the determining means for determining a pulse width calculates a leading pulse width as the pulse width of the write strategy parameters for recording each mark, based on a ratio of a recommended leading pulse width parameter of the write strategy for recording each mark included in the recommended write strategy parameters with respect to the square of the recommended leading pulse width parameter of the write strategy for recording the shortest mark included in the recommended write strategy parameters.

32. The optical recording device of claim 31, wherein: the write strategy is a multi-pulse type of strategy.

33. The optical recording device of claim 32, wherein the determining means carries out a computation using, as the predetermined calculation formula, a formula predetermined for the optical recording device used in recording.

* * * * *